Aug. 25, 1959    F. X. LAMB    2,901,704
ELECTRICAL INSTRUMENT WITH SCALE FORMED ON CASE
Filed Nov. 12, 1954    2 Sheets-Sheet 1
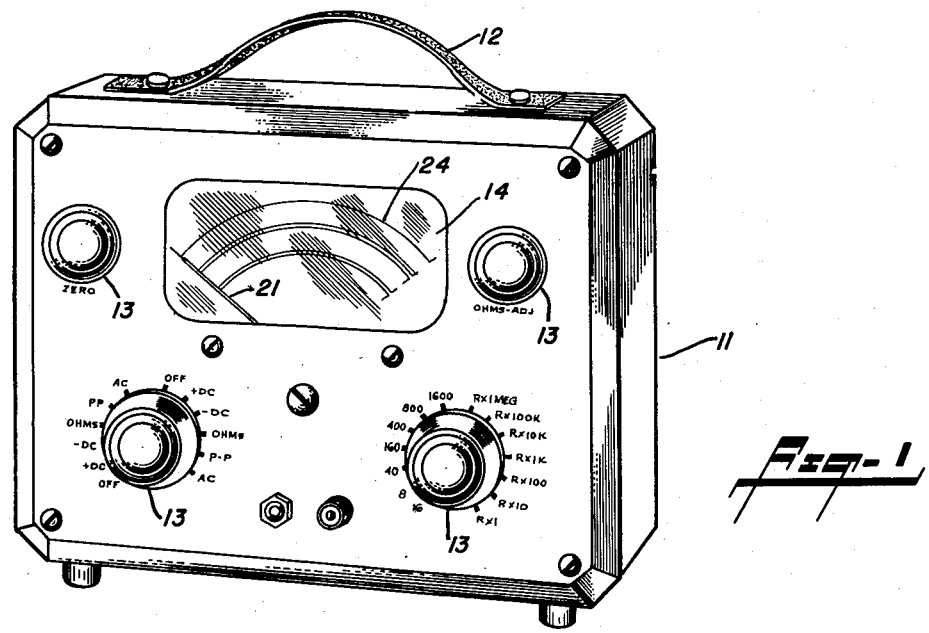
FRANCIS X. LAMB
INVENTOR.
BY
Rudolph J. Junck
ATTORNEY

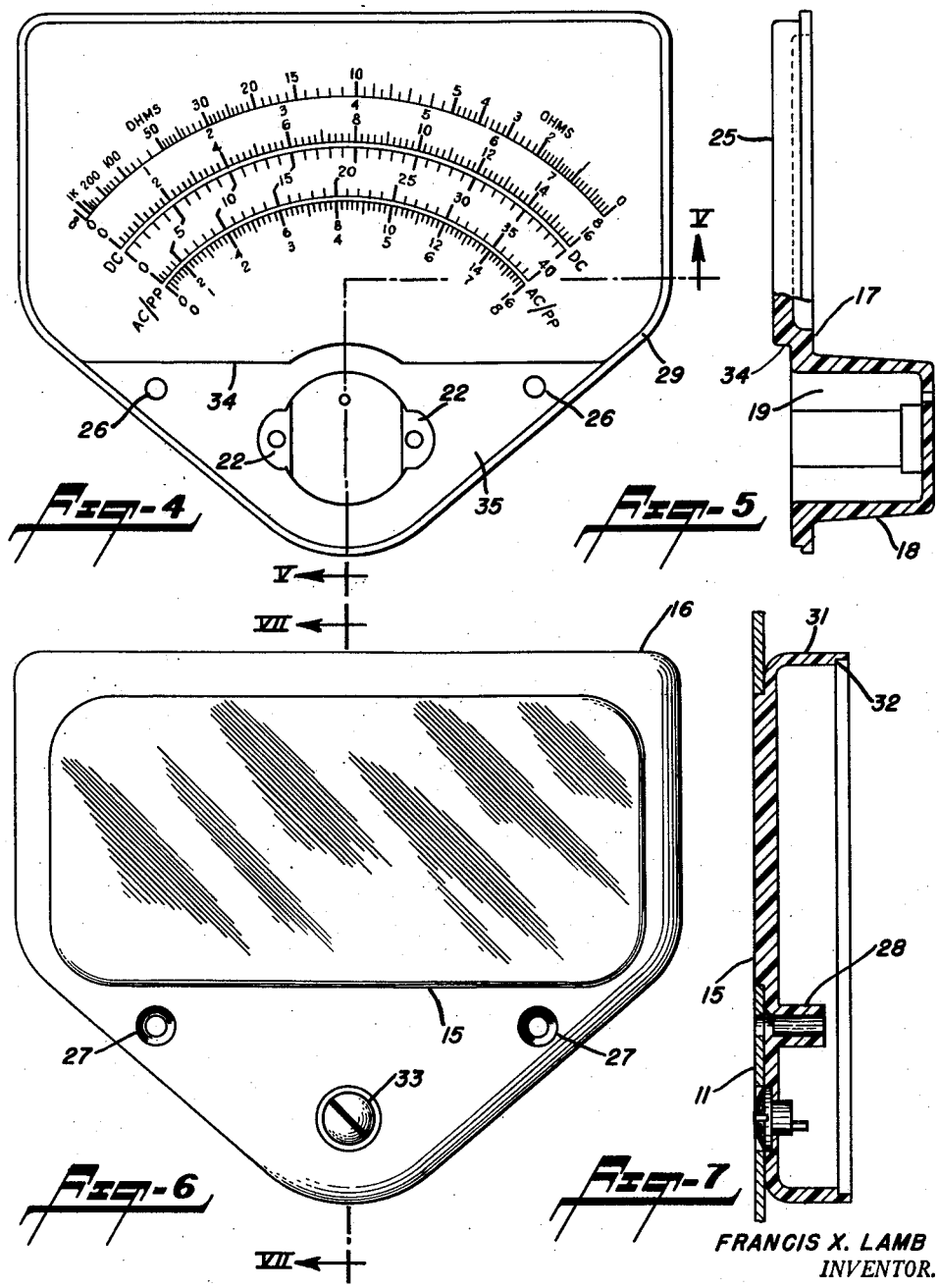

United States Patent Office 2,901,704
Patented Aug. 25, 1959

2,901,704

ELECTRICAL INSTRUMENT WITH SCALE FORMED ON CASE

Francis X. Lamb, East Orange, N.J., assignor, by mesne assignments, to Daystrom, Incorporated, Murray Hill, N.J., a corporation of New Jersey Application November 12, 1954, Serial No. 468,192

1 Claim. (Cl. 324—156)

This invention relates to electrical indicating instruments and more particularly to instruments especially adapted for use as a component part of test equipment contained within a suitable housing.

Instruments of the class contemplated by this invention generally each comprise a housing enclosing or carrying an electrical indicating mechanism that includes a pointer movable relative to a fixed calibrated scale. In accordance with my invention the formerly-used separate scale plate, over which the instrument pointer moved when a reading was to be taken, has been eliminated and replaced by a scale printed directly on a member forming a component part of the instrument housing or case.

An object of my invention is to simplify the construction and assembly of an electrical indicating instrument and thereby realize manufacturing economies.

An object of my invention is to decrease the manufacturing labor and to avoid the possibility of scale displacement in an electrical instrument by forming the scale on an integral part of the instrument housing.

An object of my invention is to provide an electrical instrument having a pointer and associated scale, said scale being printed directly on an integral part of the instrument base and over which a transparent cover fits for completing the case, the scale-viewing portion of said cover having an outwardly projecting flat boss receivable in an opening in a panel or in the front panel of testing apparatus.

An object of this invention is the provision of an electrical instrument of the type including a pointer cooperating with a calibrated scale and wherein the scale is carried by the transparent cover of the instrument.

These and other objects and advantages of the invention will become apparent from the following specification, when taken with the accompanying drawings. It will be understood the drawings are for the purpose of illustration and are not to be construed as defining the scope or limits of the invention, reference being had for the latter purpose to the appended claim.

In the drawings, wherein like references denote like parts in the several views:

Figure 1 is a perspective view of test apparatus incorporating an instrument embodying my invention;

Figure 2 is a plan or front view of the complete instrument and its case which carries the calibrated scale in accordance with one specific embodiment of the invention;

Figure 3 is a side elevational view of the instrument of Figure 2;

Figure 4 is a plan or front view of the base part of the instrument case;

Figure 5 is a partial side elevational view and partial sectional view taken along the line V—V of Figure 4;

Figure 6 is a plan or front view of the transparent cover of the instrument removed from the base; and Figure 7 is a transverse sectional view taken along the line VII—VII of Figure 6, a fragmentary portion of the outer front or top wall of the test equipment housing being illustrated to show how the boss on the transparent scale-viewing cover fits therein.

Reference is made to Figure 1 which illustrates representative test apparatus, such as a vacuum tube voltmeter. Such apparatus includes an electrical indicating instrument (shown separately in Figures 2 and 3 and having a pointer 21 movable between stops 30 and cooperating with suitably calibrated scales 24), various electrical and electronic components, and associated parts, all contained within a housing 11. In the case of portable apparatus, the housing may have attached thereto a suitable carrying strap 12, and the front panel usually carries a plurality of finger-rotatable knobs 13 controlling the operation of various switches, etc., as is well known in this art. The front panel of the housing 11 is provided with a generally rectangular opening for receiving the window portion of the transparent cover 16 of the electrical indicating instrument, here generally identified by the numeral 14, and to be more specifically described hereinbelow.

It may be pointed out, however, that the instrument cover 16 is formed with an integral raised portion or flat-faced boss 15, defined by a peripheral shoulder extending perpendicular to that part of the cover therebeyond, corresponding in shape to that of the opening in the panel of the housing 11. The height or thickness of such raised portion 15 is substantially equal to the thickness of the panel so that the outer surface of the window is flush with the outer surface of the panel when assembled therewith.

Referring now particularly to Figures 2 to 7, inclusive, there is shown the lower portion, or base, 17 of the instrument case comprising an integral member desirably formed of Bakelite or other suitable moldable material as by molding. The unitary base 17 comprises two main parts: first, a flanged, cup-like container 18 forming a well or cavity 19 in which is received the instrument mechanism 36; and second, a laterally-extending relatively flat deck 25. The instrument mechanism may be secured in position by screws which pass through apertures in the bottom wall of the container 18. When the mechanism is secured within the well 19 the pointer will move over a scale 24 formed, as by printing, directly on the face, upper or front surface of the generally flat deck, or case part 25 extending laterally to one side only from the upper edge of the cup-like portion 18.

It will be seen that the scale-carrying surface of the deck 25 which extends to only one side from the upper edge of the well 19, is disposed in a plane slightly above the level of the upper edge of the well portion 19, as indicated by the small shoulder 34, so that the instrument pointer is close to said surface. Although in the present embodiment I have shown several concentric scales, representing respectively electrical units, including ohms, volts, etc., it will be understood that I do not wish to be limited to this scale arrangement.

The flat raised or upwardly offset portion 15 of the transparent cover 16 is receivable in the generally rectangular opening in the front panel of the housing 11, previously mentioned, and lies parallel and close to the instrument scale when the cover is inserted over the base 17. These parts are formed with registering apertures 26 and 27, respectively, so that fastening screws may be received therein for holding them in assembled relationship, as well as for securing the instrument to the top panel of the housing. It will also be seen that the apertures in the transparent cover 16 pass through reinforcing bosses 28.

The lower or far surface of the deck portion 25, as well as the apertured flange 35 at the top of the well portion 18, are provided with an outstanding coplanar peripheral flange 29 of less thickness than said deck portion. The transparent cover portion 16 is provided with a corresponding depending peripheral flange or rim 31 which closely nests over and encloses the deck portion above its flange at the edge portion of the base. Such rim extends to engage the flange of said deck portion and is notched to encircle said flange and form a shoulder 32 extending inwardly therefrom to engage the top or near face of the flange 29 on the instrument base 17. The transparent cover portion 16 has a screw 33 journalled therein to provide for zero adjustment of the instrument, as will be understood by those skilled in this art.

From the above description of my invention it will be apparent that I provide an instrument of pleasing design and simplified construction and in which the scale plate is carried on a member that forms part of the enclosing case. Such instrument may be used for general purposes or it may be incorporated into a test set housing.

Having now described my invention in detail, in accordance with the requirements of the patent statutes, various changes and modifications will suggest themselves to those skilled in the art, and it is intended that such changes and modifications shall fall within the spirit and scope of the invention as recited in the following claim.

I claim:

A combined electrical indicating instrument mechanism carrying member and scale consisting of an integrally molded case, including a cup-like container portion for receiving an instrument mechanism having a pointer and a flat deck portion extending laterally to one side only from the upper edge of said cup-like portion, a scale formed directly on the upper face of said deck portion whereby the pointer is adapted to travel thereover, said deck portion having a coplanar flange extending from the periphery adjacent the bottom surface thereof and of less thickness than said deck portion, a transparent cover with a scale-viewing portion disposed parallel to and with a peripheral flange enclosing said deck portion above its flange and extending to engage the flange of said deck portion and notched to encircle said flange, said deck portion and transparent cover having registering holes for receiving connecting means, and the scale-viewing portion of said cover being upwardly offset to form a flat boss for reception in an opening in a supporting panel.

References Cited in the file of this patent

UNITED STATES PATENTS

| | | |
|---|---|---|
| 480,898 | Weston | Aug. 16, 1892 |
| 1,924,039 | Hockley | Aug. 22, 1933 |
| 1,929,714 | Reich | Oct. 10, 1933 |
| 2,023,860 | Stanton | Dec. 10, 1935 |
| 2,117,945 | Cooper | May 17, 1938 |
| 2,150,836 | Lamb | Mar. 14, 1939 |
| 2,206,437 | Tracy | July 2, 1940 |
| 2,371,603 | Bradley | Mar. 20, 1945 |
| 2,422,714 | Bigelow | June 24, 1947 |
| 2,471,704 | Rose | May 31, 1949 |
| 2,515,021 | Simpson | July 11, 1950 |
| 2,554,978 | De Giers | May 29, 1951 |
| 2,612,132 | Tripplett | Sept. 30, 1952 |
| 2,668,446 | Kraemer | Feb. 9, 1954 |
| 2,791,748 | Mitchell | May 7, 1957 |